United States Patent [19]

Kung

[11] Patent Number: 4,962,984

[45] Date of Patent: Oct. 16, 1990

[54] CONSTANT-SPEED SCANNING LENS SYSTEM

[75] Inventor: Chien-Ping Kung, Hsin-Chu, Taiwan

[73] Assignee: Industrial Technology Research Institute, Taiwan, Taiwan

[21] Appl. No.: 241,631

[22] Filed: Sep. 8, 1988

[51] Int. Cl.$^5$ .............................................. G02B 26/10
[52] U.S. Cl. ...................................... 350/6.8; 350/479
[58] Field of Search .................... 350/6.1, 6.2, 6.3, 6.4, 350/6.5, 6.6, 6.7, 6.8, 6.9, 6.91, 479

[56] References Cited

U.S. PATENT DOCUMENTS

| | | | |
|---|---|---|---|
| 4,179,183 | 12/1979 | Tateoka et al. | 350/479 |
| 4,269,478 | 5/1981 | Maeda et al. | 350/6.8 |
| 4,512,625 | 4/1985 | Brueggemann | 350/6.8 |
| 4,818,046 | 4/1989 | Kondo | 350/6.8 |

OTHER PUBLICATIONS

Modern Optical Engineering by Warren J. Smith, cover page and pp. 52–57, 1984.

*Primary Examiner*—Bruce Y. Arnold
*Assistant Examiner*—Loha Ben
*Attorney, Agent, or Firm*—Darby & Darby

[57] ABSTRACT

A constant-speed scanning lens system composed of two lens components. One lens component is a biconcave negative lens having the function of diverging parallel rays. The other lens component is a biconvex positive lens having the function of focusing diverging rays. The constant-speed scanning lens system is of a compact size and has a wider scanning angle than previously attainable.

7 Claims, 7 Drawing Sheets

CONSTANT-SPEED SCANNING LENS SYSTEM

BACKGROUND OF THE INVENTION

Figure 1:
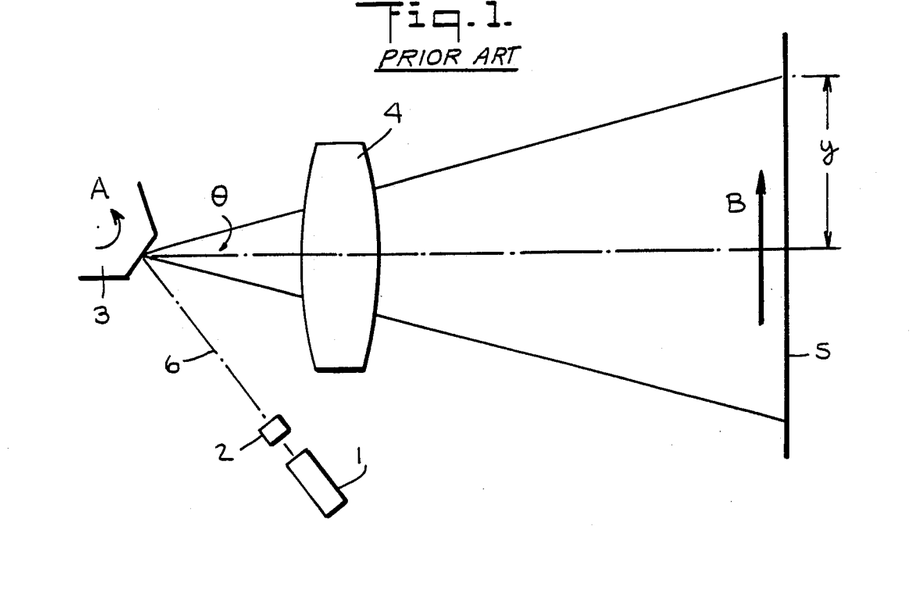
FIG. 1 shows a flat-surface scanning optical system employing a reflecting polygon mirror.

In a conventional flat-surface scanning optical system, a constant-speed scanning system is used as shown in FIG. 1.

In this optical system, a laser beam is emitted from the light source 1 and passes through the collimating lens 2 to form a stream of parallel light 6. The light is then reflected by a reflecting polygon mirror 3 (reflecting rotating mirror 3) and passed through an image lens 4 to form an image on the screen surface 5. The reflecting polygon mirror 3 rotates counterclockwise as shown with arrowhead A and, therefore, the light beam striking the screen surface 5 moves in the direction of arrowhead B.

As a general rule, the relation among the field angle $\theta$, focal length f and image height y (distance between the center of screen surface 5 and the beam spot on the surface) is as follows:

$$y = f \tan \theta \quad (1)$$

In other words, the image height y varies in direct proportion to $\tan \theta$. When the angular velocity $\omega$ of the reflecting polygonal mirror 3 is a constant, the variation of $\tan \theta$ becomes larger as the rotational angle $\theta$ becomes larger. This results in variations of the speed at which the light beam moves across the surface of the screen 5.

To eliminate this disadvantage, it is possible to modify the speed of rotation of the reflecting polygon mirror 3 to compensate for the different speed at different angles and control the beam so that it moves at a constant speed. But this procedure is so complicated that it is not easily implemented.

It has been suggested to use a so-called f$\theta$ lens (image lens) to attain a constant scanning while using a reflecting polygon mirror which rotates at a constant speed. See U.S. Pat. Nos. 4,269,478 and 4,401,362.

The relations in the f$\theta$ lens are as follows:

$$y = f \theta \quad (2)$$

where y is image height, $\theta$ is field angle, and f is focal length.

When a lens system satisfies the formula (2), the image height y varies constantly when $\theta$ varies uniformly.

Generally, distortion (D) is defined as follows:

$$D = \frac{y' - f \tan\theta}{f \tan\theta} \times 100\% \quad (3)$$

where y' is the actual image height of the beam on the screen surface 5. With an f$\theta$ lens system, a negative distortion (D) results. In contrast, the aberration of distortion (D) is accordingly modified as D' for the f$\theta$ lens system.

$$D' = \frac{y - f\theta}{f\theta} \times 100\% \quad (4)$$

Naturally, it is desired that D' be approximately 0.

The relation among the size of beam, wave length and the system's F-Number is as follows:

$$d = k*(F/\#)*\lambda \quad (5)$$

where d is diameter of beam spot, $\lambda$ is wave length of incident light, and k is a constant.

For the incident light toward a circular aperture, k is 2.44 and the depth of focus (d') of the scanning light beam is expressed in the following formula:

$$d' = \pm 2*\lambda*(F/\#)^2 \quad (6)$$

When it is desired that the diameter of the beam spot (d) be smaller, the wave length $\lambda$ or F/# should be smaller. This makes the depth of focus (d') shorter because it is in direct proportion to the F/# squared.

It is also desired that both the tangential image surface and sagittal image surface be within the depth of focus (d') when a light beam passes through the lens system. When this is achieved, a high performance output can be obtained in the optical system. Accordingly, it is critical to determine the value of F/# in an optical system.

Because the value of F/# in the constant-speed scanning lens system is usually a somewhat large value, spherical aberration and coma aberration caused by the light beam passing through the lens system are not too important. On the other hand, astigmatism aberration and distortion aberration are key factors.

To conclude, the aberration of distortion on the screen surface 5 should satisfy the demand of the system in order that the D' in formula (4) approaches zero. Additionally, the tangential image surface and the sagittal image surface sagittal plane should be within the depth of focus (d'). The output of such an optical system can approach the diffraction limit.

In order to achieve these desired results, lens systems have been developed as described in the aforesaid U.S. patents. However, these systems were bulky and inconvenient because they required a plurality of lenses and, in addition, did not have an adequately wide scanning angle.

BRIEF DESCRIPTION OF THE INVENTION

In accordance with the instant invention, an f$\theta$ lens system has been developed which requires the use of only two lenses and yet has a maximum scanning angle of 45°. This is a marked improvement over the prior art U.S. patents wherein the maximum scanning angles were 33° and 29°, respectively.

DETAILED DESCRIPTION OF THE INVENTION

In accordance with the invention, the constant speed scanning lens system has been developed of an unusually compact size.

Figure 2:
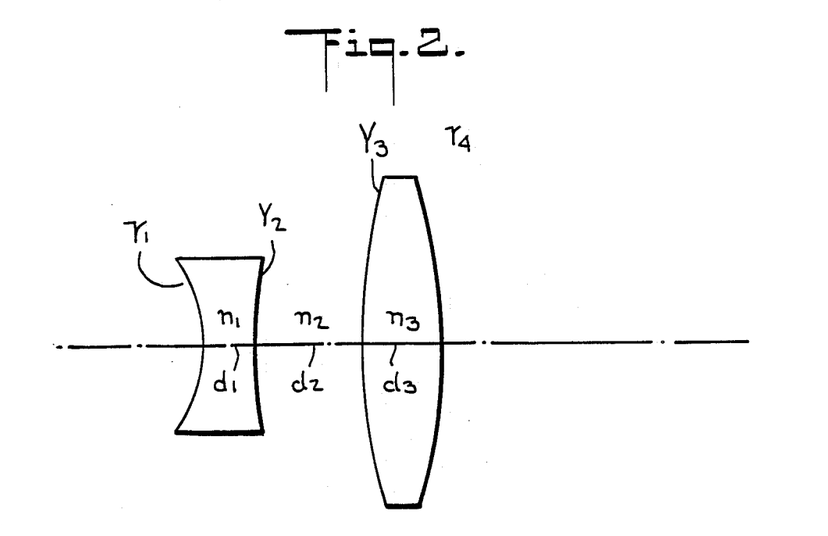
FIG. 2 shows a constant-speed scanning lens system according to the present invention.

The maximum length (L) of the system is smaller than or equals $0.28f$ $[L = (d_1 + d_2 + d_3) \leq 0.28f]$ and the system is composed of two lens components. The first component is a biconcave negative lens having the function of diverging parallel rays and a thickness $d_1$; the second one is a biconvex positive lens having the function of focusing diverging rays and a thickness $d_3$; and $d_2$ is the airspace between the lenses.

The lens system of the invention satisfies the following conditions:

(1) $0.0734\ f < d_2 < 0.097\ f$
(2) $-3.9230\ f < r_1 < -1.623\ f$
(3) $-35.3 < r_3/r_4 < -7.5$ where $r_1$ is radius of curvature at the incident side of the first lens component, $r_3$ is radius of curvature at the left side of the second lens component; $r_4$ is radius of curvature at the right side of the second lens component, and f is focal length of the scanning lens system.

Using these criteria, a negative distortion results which acts as an $f\theta$ lens, so that the value of $D'$ ($D' = [(y' - f\theta)/f\theta]*100\%$) approaches zero. Additionally, for the diameter of the beam to be near the diffraction limit, the depth of focus of the beam on the screen surface includes both the tangential image surface and sagittal image surface sagittal. Accordingly, the system of the present invention satisfies the three conditions required to obtain optimum results.

In condition (1), if $d_2$ is larger than the upper limit 0.097f, the aberration of distortion would be a large negative distortion, while the field curvature would increase toward the lens direction. If $d_2$ is smaller than the lower limit 0.0734f, the field curvature would be poor and distortion aberration would result on the screen surface.

If $r_1$, in condition (2), is larger than the upper limit $-1.623f$, the aberration of distortion is a larger negative value, while the field curvature increases toward the lens direction. If $r_2$ is smaller than the lower limit $-3.923f$, a similar result occurs.

If $r_3/r_4$, in condition (3), is larger than the upper limit $-7.5$, the aberration of distortion is a larger negative value, while the field curvature increases toward the lens direction. If $r_3/r_4$ is smaller than the lower limit $-35.3$, a similar result occurs.

Six preferred embodiments of the constant-speed scanning lens system according to the invention are set forth below. In these embodiments:

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

EXAMPLE 1

| | | |
|---|---|---|
| $r_1 = -2.869$ | $d_1 = 0.065$ | $n_1 = 1.511187$ |
| $r_2 = 1.876$ | $d_2 = 0.088$ | $n_2 = 1.000000$ |
| $r_3 = 8.308$ | $d_3 = 0.093$ | $n_3 = 1.785668$ |
| $r_4 = -0.619$ | | |
| $f = 1$ | $y = 0.77$ | $r_3/r_4 = -13.43$ |
| | $\lambda = 780$ nm | |

Figure 3A:
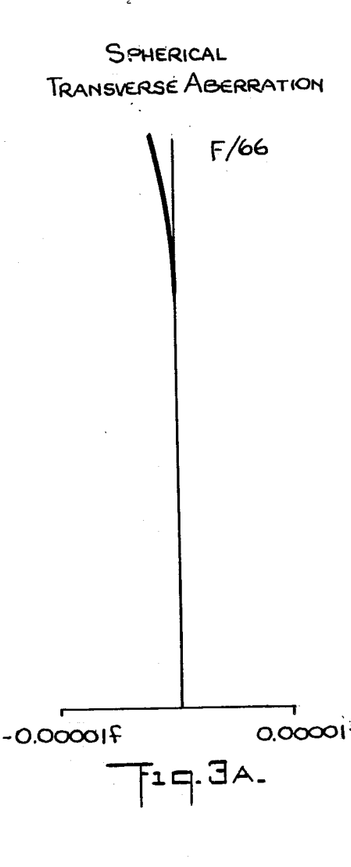
FIG. 3 to FIG. 8 show a series of graphs of the spherical and astigmatic aberration and linearity on the screen surface in the lens system according to the preferred embodiments of the invention.
Figure 3B:
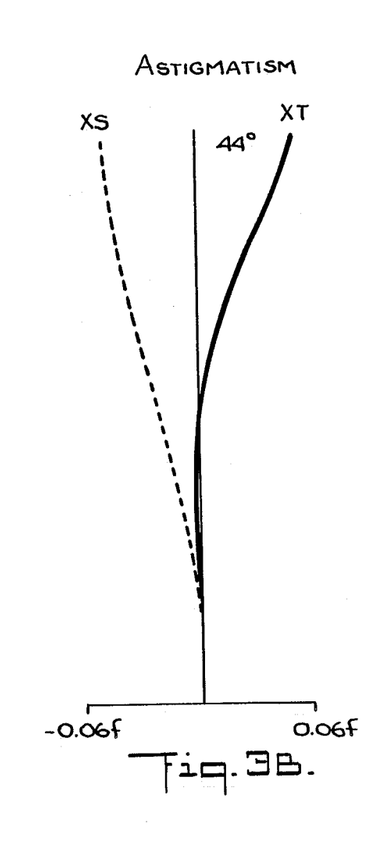
Figure 3C:
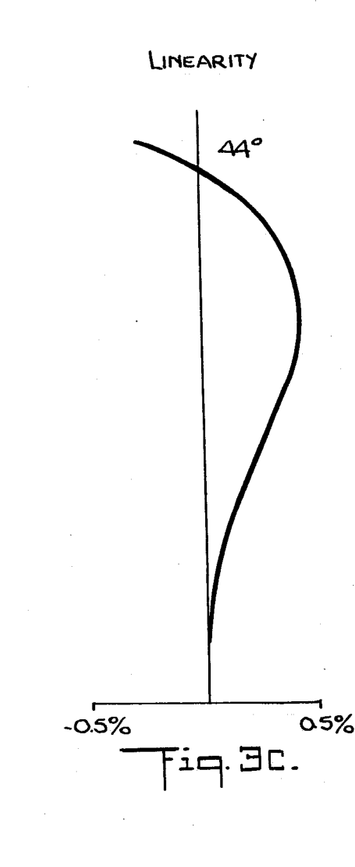

The spherical aberration, astigmatism and linearity of the lens system is shown in FIGS. 3A, 3B and 3C, respectively.

EXAMPLE 2

| | | |
|---|---|---|
| $r_1 = -2.957$ | $d_1 = 0.065$ | $n_1 = 1.511187$ |
| $r_2 = 1.84$ | $d_2 = 0.088$ | $n_2 = 1.000000$ |
| $r_3 = 8.213$ | $d_3 = 0.094$ | $n_3 = 1.785668$ |
| $r_4 = -0.619$ | | |
| $f = 1$ | $y = 0.77$ | $r_3/r_4 = -13.268$ |
| | $\lambda = 780$ nm | |

Figure 4A:
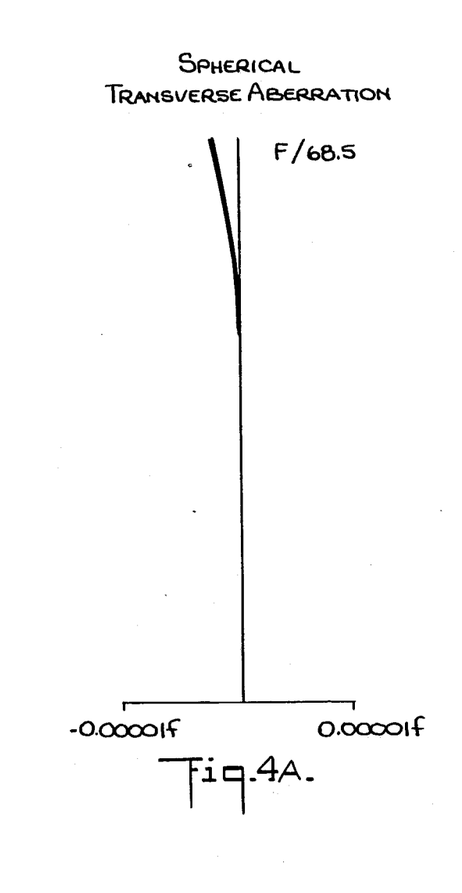
Figure 4B:
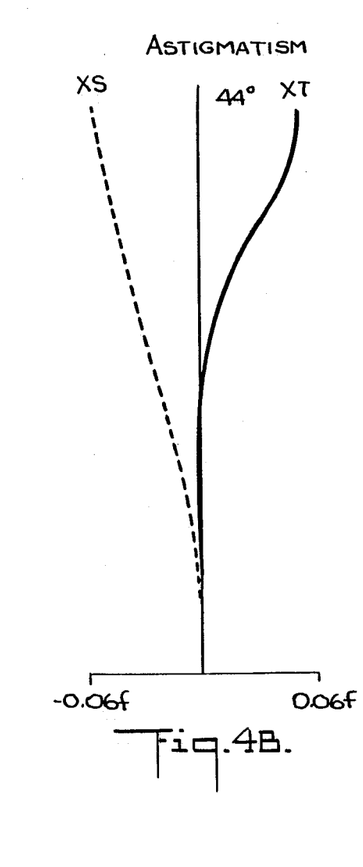
Figure 4C:
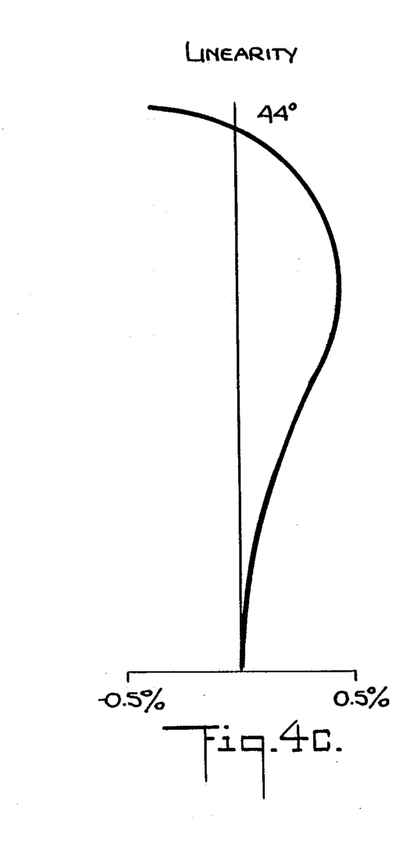

The spherical aberration, astigmatism and linearity of the lens system is shown in FIGS. 4A, 4B and 4C, respectively.

EXAMPLE 3

| | | |
|---|---|---|
| $r_1 = -2.751$ | $d_1 = 0.067$ | $n_1 = 1.511187$ |
| $r_2 = 1.931$ | $d_2 = 0.087$ | $n_2 = 1.000000$ |
| $r_3 = 8.522$ | $d_3 = 0.093$ | $n_3 = 1.785668$ |
| $r_4 = -0.618$ | | |
| $f = 1$ | $y = 0.77$ | $r_3/r_4 = -13.79$ |
| | $\lambda = 780$ nm | |

Figure 5A:
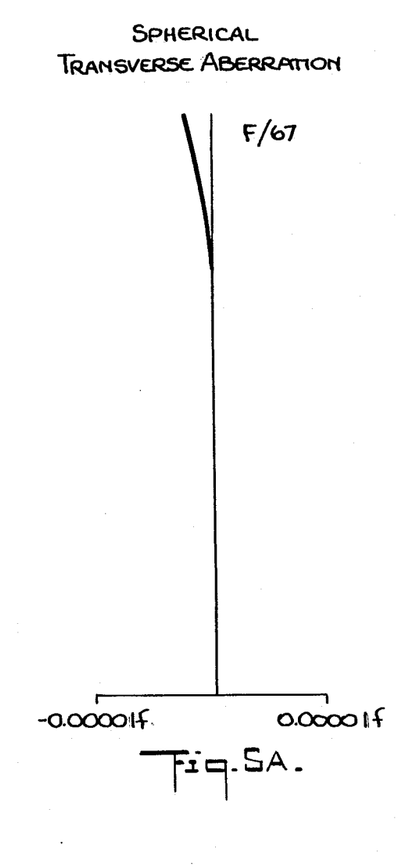
Figure 5B:
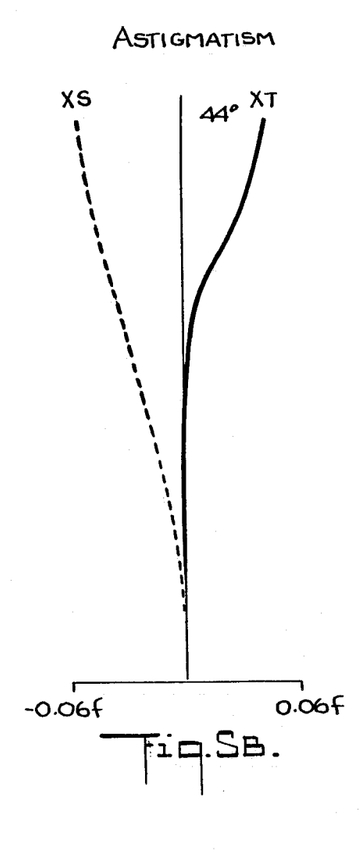
Figure 5C:
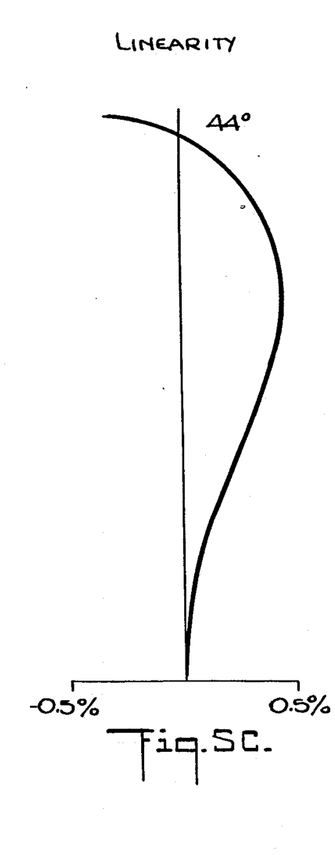

The spherical aberration, astigmatism and linearity of the lens system is shown in FIGS. 5A, 5B and 5C, respectively.

EXAMPLE 4

| | | |
|---|---|---|
| $r_1 = -2.633$ | $d_1 = 0.067$ | $n_1 = 1.511187$ |
| $r_2 = 1.994$ | $d_2 = 0.087$ | $n_2 = 1.000000$ |
| $r_3 = 8.608$ | $d_3 = 0.092$ | $n_3 = 1.785668$ |
| $r_4 = -0.617$ | | |
| $f = 1$ | $y = 0.77$ | $r_3/r_4 = -13.95$ |
| | $\lambda = 780$ nm | |

Figure 6A:
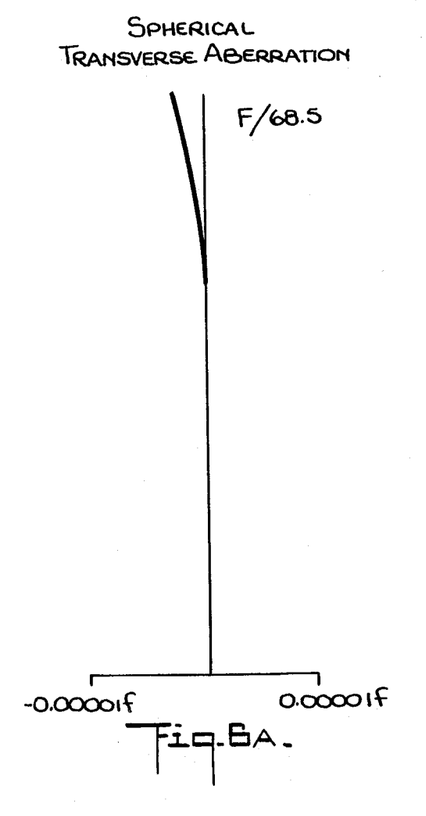
Figure 6B:
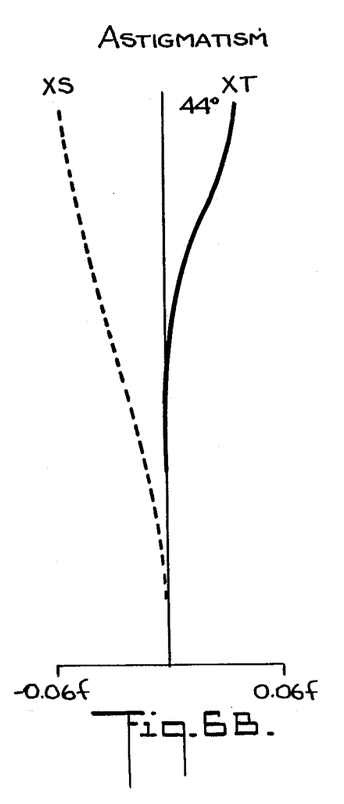
Figure 6C:
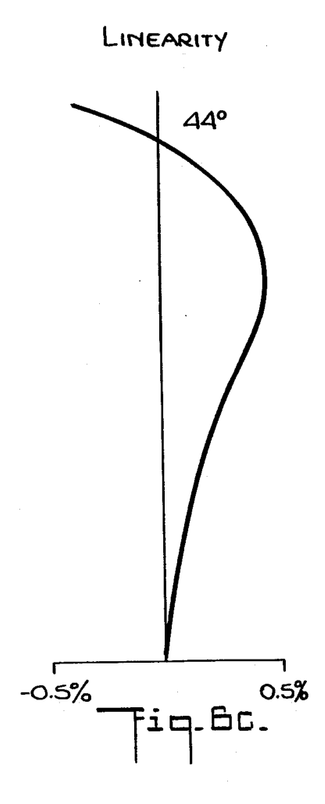

The spherical aberration, astigmatism and linearity of the lens system is shown in FIGS. 6A, 6B and 6C, respectively.

EXAMPLE 5

| | | |
|---|---|---|
| $r_1 = -1.896$ | $d_1 = 0.066$ | $n_1 = 1.511187$ |
| $r_2 = 2.831$ | $d_2 = 0.089$ | $n_2 = 1.000000$ |
| $r_3 = 20.259$ | $d_3 = 0.100$ | $n_3 = 1.785668$ |
| $r_4 = -0.598$ | | |
| $f = 1$ | $y = 0.77$ | $r_3/r_4 = -33.877$ |
| | $\lambda = 780$ nm | |

Figure 7A:
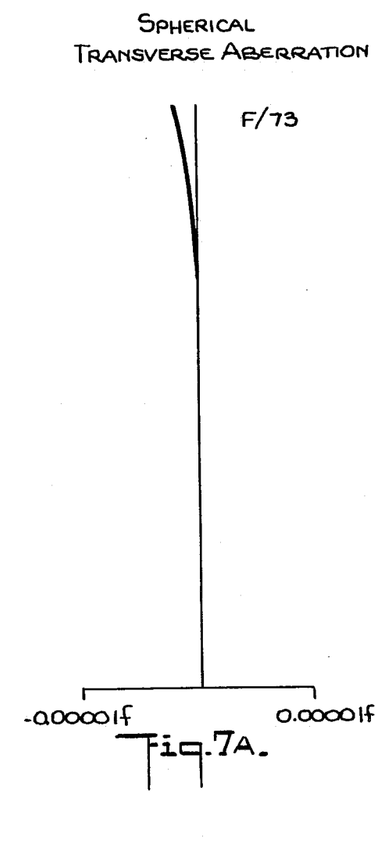
Figure 7B:
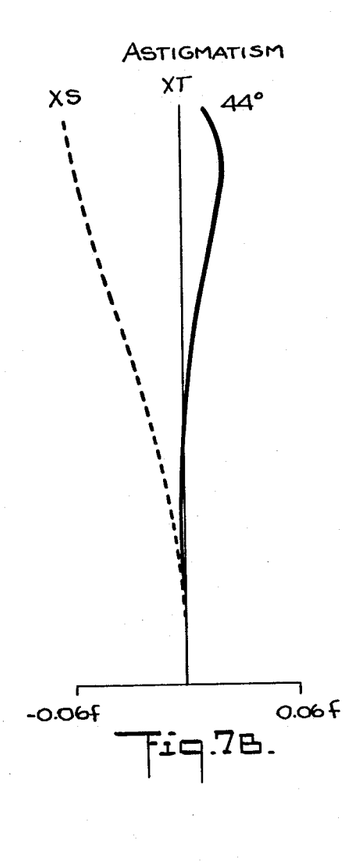
Figure 7C:
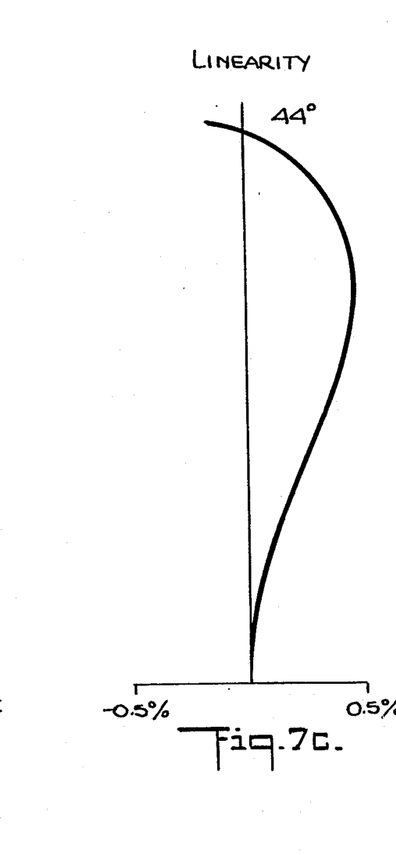

The spherical aberration, astigmatism and linearity of the lens system is shown in FIGS. 7A, 7B and 7C, respectively.

EXAMPLE 6

| | | |
|---|---|---|
| $r_1 = -3.576$ | $d_1 = 0.066$ | $n_1 = 1.511187$ |
| $r_2 = 1.662$ | $d_2 = 0.079$ | $n_2 = 1.000000$ |
| $r_3 = 5.642$ | $d_3 = 0.090$ | $n_3 = 1.785668$ |
| $r_4 = -0.636$ | | |
| $f = 1$ | $y = 0.77$ | $r_3/r_4 = -8.871$ |
| | $\lambda = 780$ nm | |

Figure 8A:
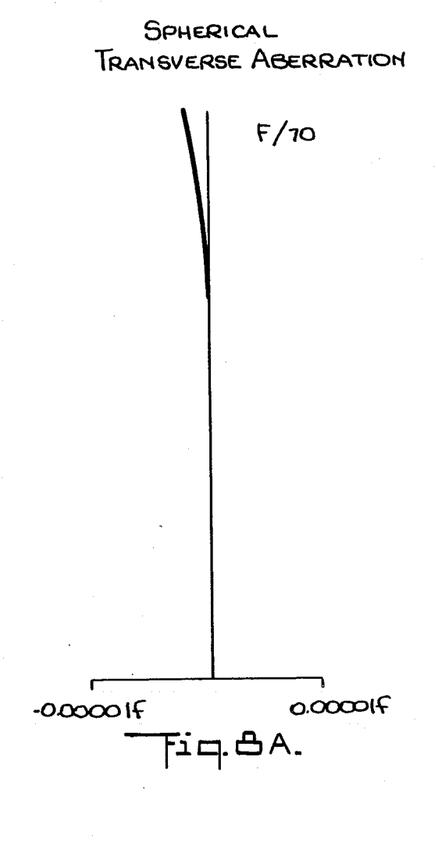
Figure 8B:
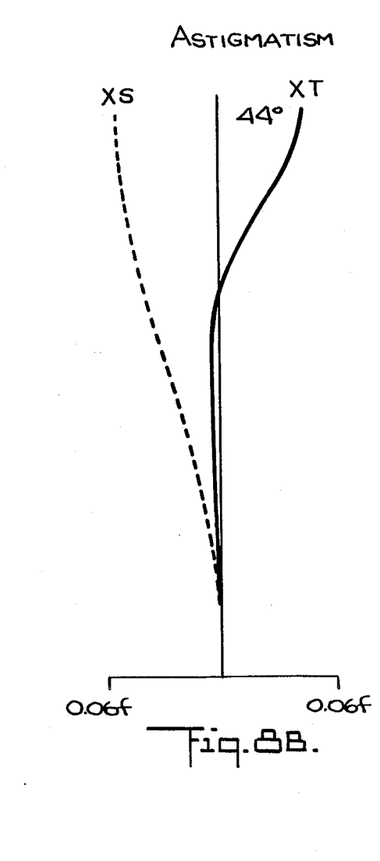
Figure 8C:
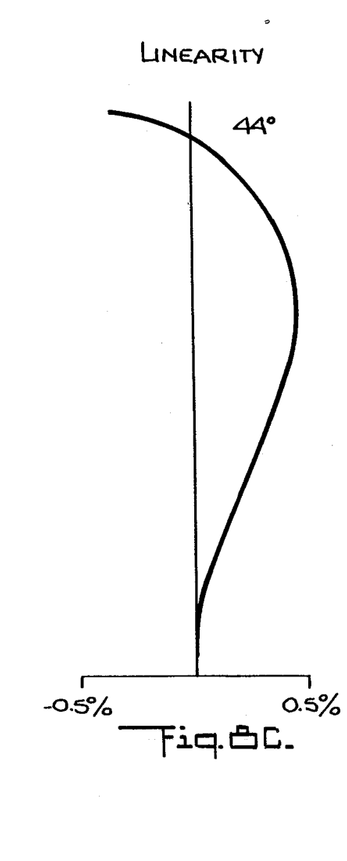

The spherical aberration, astigmatism and linearity of the lens system is shown in FIGS. 8A, 8B and 8C, respectively.

What is claimed is:

1. A constant-speed scanning lens system comprising a first and a second lens each having a common principal axis and being in spaced relationship to one another, (a) said first lens being a biconcave negative lens having the function of diverging parallel rays; and (b) said second lens being a biconvex positive lens having the function of focusing said diverging rays;

and which satisfy the following conditions:

(1) $0.0734\ f < d_2 < 0.097\ f$
(2) $-3.9230\ f < r_1 - 1.623\ f$
(3) $-35.3 < r_3/r_4 < -7.5$ wherein $d_2$ is the airspace between the first lens and the second lens;

$r_1$ is the radius of curvature of the light entrance side of the first lens;

$r_3$ is the radius of curvature of the light entrance side of the second lens;

$r_4$ is the radius of curvature of the light exit side of the second lens; and f is the focal length of the scanning lens system.

2. The constant-speed scanning lens system of claim 1, wherein the system has the following specific numerical values:

| | | |
|---|---|---|
| $r_1 = -2.869$ | $d_1 = 0.065$ | $n_1 = 1.511187$ |
| $r_2 = 1.876$ | $d_2 = 0.088$ | $n_2 = 1.000000$ |
| $r_3 = 8.308$ | $d_3 = 0.093$ | $n_3 = 1.785668$ |
| $r_4 = -0.619$ | | |
| $f = 1$ | $y = 0.77$ | $r_3/r_4 = -13.43$ |
| | $\lambda = 780$ nm | |

$r_1$–$r_4$ are, respectively, the radius of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

3. The constant-speed scanning lens system of claim 1, wherein the system has the following specific numerical values:

| | | |
|---|---|---|
| $r_1 = -2.957$ | $d_1 = 0.065$ | $n_1 = 1.511187$ |
| $r_2 = 1.84$ | $d_2 = 0.088$ | $n_2 = 1.000000$ |
| $r_3 = 8.213$ | $d_3 = 0.094$ | $n_3 = 1.785668$ |
| $r_4 = -0.619$ | | |
| $f = 1$ | $y = 0.77$ | $r_3/r_4 = -13.268$ |
| | $\lambda = 780$ nm | |

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

4. The constant-speed scanning lens system of claim 1, wherein the system has the following specific numerical values:

| | | |
|---|---|---|
| $r_1 = -2.751$ | $d_1 = 0.067$ | $n_1 = 1.511187$ |
| $r_2 = 1.931$ | $d_2 = 0.087$ | $n_2 = 1.000000$ |
| $r_3 = 8.522$ | $d_3 = 0.093$ | $n_3 = 1.785668$ |
| $r_4 = -0.618$ | | |
| $f = 1$ | $y = 0.77$ | $r_3/r_4 = -13.79$ |
| | $\lambda = 780$ nm | |

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

5. The constant-speed scanning lens system of claim 1, wherein the system has the following specific numerical values:

| | | |
|---|---|---|
| $r_1 = -2.633$ | $d_1 = 0.067$ | $n_1 = 1.511187$ |
| $r_2 = 1.994$ | $d_2 = 0.087$ | $n_2 = 1.000000$ |
| $r_3 = 8.608$ | $d_3 = 0.092$ | $n_3 = 1.785668$ |
| $r_4 = -0.617$ | | |
| $f = 1$ | $y = 0.77$ | $r_3/r_4 = -13.95$ |
| | $\lambda = 780$ nm | |

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

6. The constant-speed scanning lens system of claim 1, wherein the system has the following specific numerical values:

| | | |
|---|---|---|
| $r_1 = -1.896$ | $d_1 = 0.066$ | $n_1 = 1.511187$ |
| $r_2 = 2.831$ | $d_2 = 0.089$ | $n_2 = 1.000000$ |
| $r_3 = 20.259$ | $d_3 = 0.100$ | $n_3 = 1.785668$ |
| $r_4 = -0.598$ | | |
| $f = 1$ | $y = 0.77$ | $r_3/r_4 = -33.877$ |
| | $\lambda = 780$ nm | |

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

7. The constant-speed scanning lens system of claim 1, wherein the system has the following specific numerical values:

| | | |
|---|---|---|
| $r_1 = -3.576$ | $d_1 = 0.066$ | $n_1 = 1.511187$ |

-continued

| | | |
|---|---|---|
| $r_2 = 1.662$ | $d_2 = 0.079$ | $n_2 = 1.000000$ |
| $r_3 = 5.642$ | $d_3 = 0.090$ | $n_3 = 1.785668$ |
| $r_4 = -0.636$ | | |
| $f = 1$ | $y = 0.77$ | $r_3/r_4 = -8.871$ |
| | $\lambda = 780$ nm | |

$r_1$–$r_4$ are, respectively, the radii of curvature of the first surface through the fourth surface of the lenses;

$d_1$–$d_3$ are, respectively, the thickness of the first lens, the airspace between lenses, and the thickness of the second lens;

$n_1$–$n_3$ are, respectively, the refractive indices of the first lens, the air space and the second lens at the wave length $\lambda = 780$ nm of the incident light;

f is the focal length of the lens system as a whole; and y is the image height.

* * * * *